United States Patent [19]

Meron

[11] Patent Number: 4,771,644
[45] Date of Patent: Sep. 20, 1988

[54] MOUNTING FLEXURE

[75] Inventor: Joseph Meron, Canoga Park, Calif.

[73] Assignee: Litton Systems, Inc., Beverly Hills, Calif.

[21] Appl. No.: 936,878

[22] Filed: Dec. 2, 1986

[51] Int. Cl.⁴ .................... G01C 19/00; F16B 1/00
[52] U.S. Cl. .................... 74/5.22; 74/5 R;
    74/5.6 R; 248/DIG. 1; 403/30
[58] Field of Search .................... 403/28, 29, 30;
    248/DIG. 1; 74/5.22, 5 R, 5.6 R

[56] References Cited

U.S. PATENT DOCUMENTS

| 2,584,653 | 2/1952 | Alpert ........................ 403/30 |
| 3,219,753 | 11/1965 | Vassos ..................... 403/28 X |
| 3,781,733 | 12/1973 | Heim ..................... 248/DIG. 1 |
| 4,227,036 | 10/1980 | Fitzgerald ................... 403/30 |

FOREIGN PATENT DOCUMENTS 1168140 12/1958 France ........................ 74/5 R

OTHER PUBLICATIONS

"Litton Proposal for the Standard Ring Laser Gyro Inertial Navigation Unit", vol. 1, prepared for U.S. Army Force, AFSC, Aeronautical Systems Division, 1/85, pp. 2-12, 2-20, 2-29, 2-31, 2-33.
"Proposal for the AN/ASN-139 Inertial Navigation Set", vol. II, 4/84, pp. 5-20, prepared for Naval Air Systems Command, Dept. of Navy.

Primary Examiner—Rodney H. Bonck
Attorney, Agent, or Firm—Nilsson, Robbins, Dalgarn, Berliner, Carson & Wurst

[57] ABSTRACT

A flexure acts as an interface for mounting a precision sensing device to a support having a different coefficient of thermal expansion. The flexure, which has substantially the same coefficient of expansion as the device, engages the support along an annular contacting surface to restrain the flexure from relative slipping movement under thermal stress. The sensing device is carried on a base of the flexure and therefore remains aligned during thermal cycling. In a preferred embodiment, the contacting surface provides tight surface-to-surface contact with a complementary surface of the support over an operating temperature range.

20 Claims, 3 Drawing Sheets

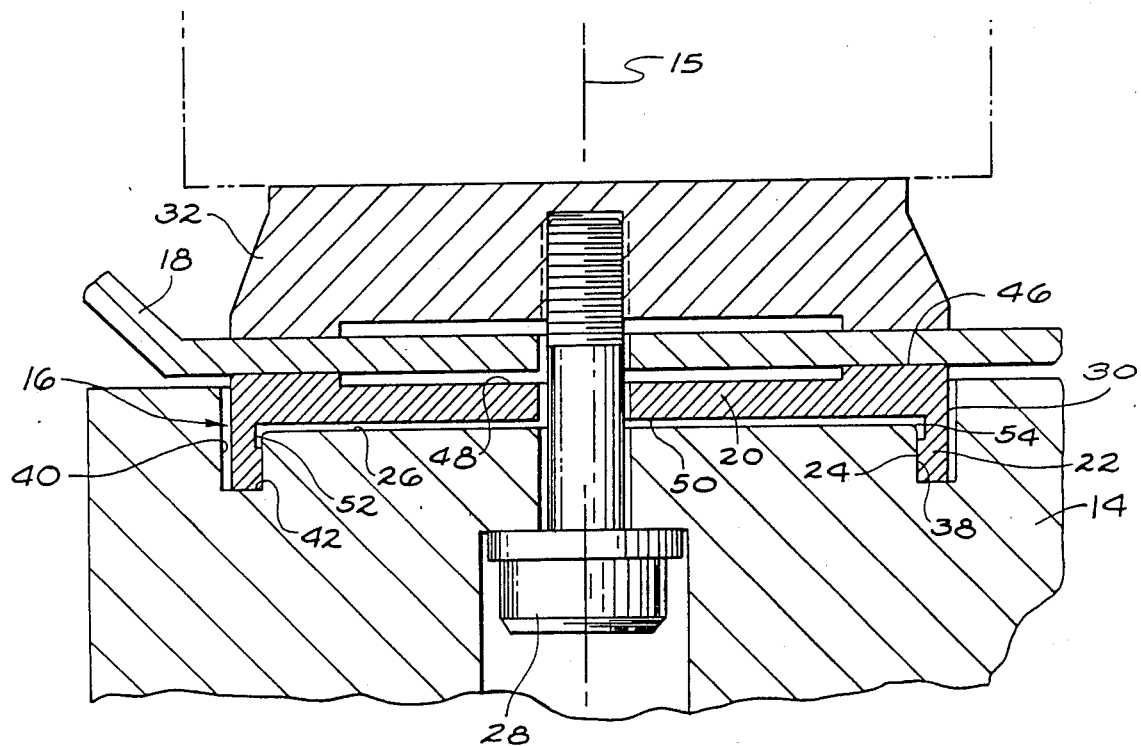
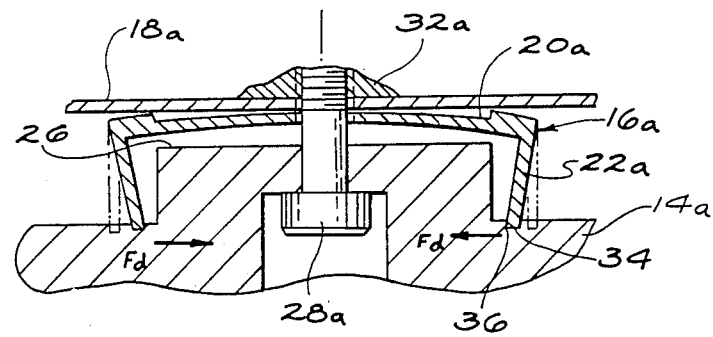
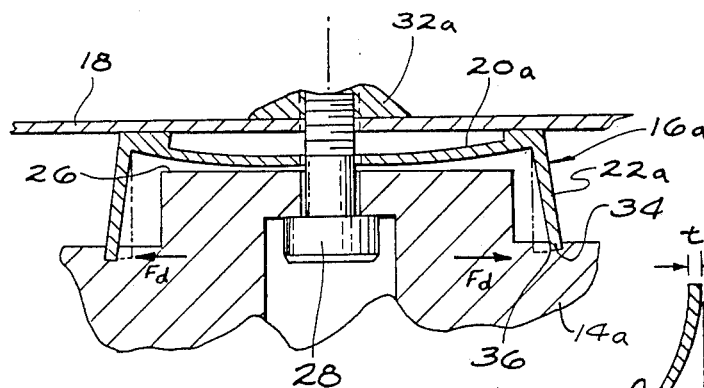
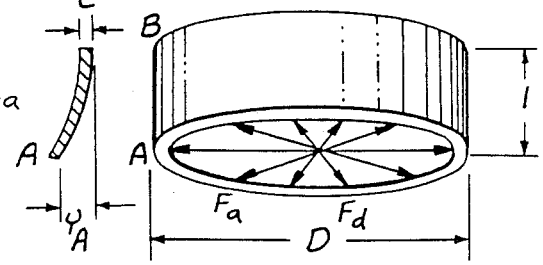

MOUNTING FLEXURE

BACKGROUND OF THE INVENTION

This invention relates to the mounting of sensor devices and, more particularly, to a flexure for holding sensor devices in accurate alignment over a wide temperature range.

Many sensing devices, such as ring laser gyros (RLG's), are sensitive to even very small movements with respect to their supporting structures. This is particularly true when three such devices are grouped together on a common block to measure input rates in three orthogonal directions. Any misalignment from true orthogonality is reflected as device error. In order to maintain accuracy, it is necessary to isolate extraneous movements and correct for them. This is simple for the predictable movement experienced when a support expands and contracts as a unit but not for erratic movements, such as the slipping or "creeping" that occurs when a device is mounted to a support having a different coefficient of thermal expansion and is subjected to changes in temperature. Unlike a simple, unified expansion or contraction, interfacial creeping caused by differences in therefore cannot be rectified.

The problem of interfacial creeping is magnified when the sensing devices are high precision RLG's. In the face of this, exotic materials have been used to eliminate thermal motion by matching the expansion coefficient of the RLG case to that of its support block. A common material for the case of an RLG is Hy-Mu-80, which contains approximately 80% Ni, 5% Mo, 0.5% Mn, 1.5% Si, 0.01% C and the balance Fe. It is preferred for a variety of properties, including the fact that it provides magnetic shielding to the RLG. In order to match the expansion coefficient of Hy-Mu-80, sensor blocks of titanium, beryllium and aluminum matrix material have been proposed. Blocks formed of these materials reduce creeping at the interface with the RLG but have serious disadvantages. Specifically, titanium has a low heat conductivity, beryllium is high in cost and aluminum matrix material is both high in cost and difficult to machine.

Therefore, it is desirable in many applications to provide an inexpensive structure by which sensor devices can be mounted on a common sensor block with no change in input axis alignment over a wide temperature range.

SUMMARY OF THE INVENTION

The present invention comprises a flexure for mounting a sensing device to a support in a dynamic thermal environment, comprising: a base having a pair of opposed major surfaces, the base being positionable between the sensing device and the support so that a first of the major surfaces faces and sensing device and a second of the major surfaces faces the support; and a skirt extending axially from the second major surface of the base to form an annular contacting surface, the skirt being engageable with the support over the contacting surface to restrain the flexure from relative slipping movement when exposed to thermal stresses.

In a preferred embodiment, the base of the flexure is substantially planar and its skirt is formed integrally with the base. In another embodiment, the annular contacting surface is circularly cylindrical and engages a complementary surface of the support to provide a positive surface-to-surface contact. When the contacting surface of the skirt is an inner cylindrical surface and the complementary surface of the support is an outer cylindrical surface, the contacting surface is fabricated to be smaller in diameter than the complementary surface over a preselected temperature range to provide the desired restraining effect. The fit can be accomplished by shrink-fitting, force-fitting or other connecting techniques, as long as the parts are dimensioned so that the surfaces remain in intimate contact.

The device of the invention relies upon a symmetric deflection of its flexure skirt to follow radial displacement of a supporting block under thermal expansion or contraction. This happens only if the flexure engages the block in rigid, intimate contact throughout the operating temperature range so that stresses are transmitted uniformly and consistently to the flexure. The flexure then deflects elastically, conforming to the block in thermal expansion. In doing so, the flexure absorbs the stresses rather than transmitting them to the base and causing displacements within a critical plane.

In order to provide the required engagement between the flexure and the support block, the skirt of the preferred embodiment is dimensioned to provide surface-to-surface contact with the complementary surface of the support throughout the temperature range. When the annular contacting surface of the skirt is an inwardly-directed circularly cylindrical surface, its unstressed diameter must be less than that of the complementary outwardly-directed surface of the support at all temperatures within the range. Appropriate dimensions of the annular contacting surface and the complementary surface of the support are determined from the differences in thermal expansion and contraction of the contacting elements over the operating temperature range.

The flexure of the invention virtually eliminates erratic creeping movement at the interface between a sensing device and its support block, even when the block has a coefficient of thermal expansion different from that of the sensing device. This permits the support block to be made of inexpensive materials such as aluminum without compromising alignment stability in the input axis of the device. The characteristics of the block must be known in order to account for predictable motion due to its expansion and contraction but do not contribute to misalignment of devices. Thus, RLG's, accelerometers or other devices mounted to a common support block by the flexure of the present invention provide accurate information over a wide temperature range. The range of interest for RLG's and accelerometers is typically between −60 and 200 degrees Fahrenheit.

BRIEF DESCRIPTION OF THE DRAWINGS

The above and other features of the present invention may be more fully understood from the following detailed description, together with the accompanying drawings, wherein similar reference characters refer to similar elements throughout and in which:

FIG. 3 is an enlarged cross-sectional view of the mounting structure of FIG. 2;

FIGS. 4A and 4B are schematic representations of a generalized version of the mounting structure of the present invention under COLD and HOT conditions;

FIG. 5 is a schematic perspective representation of the skirt of the flexure of the present invention, along with a cross-sectional view of a portion of the skirt under substantial thermal stress.

DESCRIPTION OF THE PREFERRED EMBODIMENTS

Figure 1:
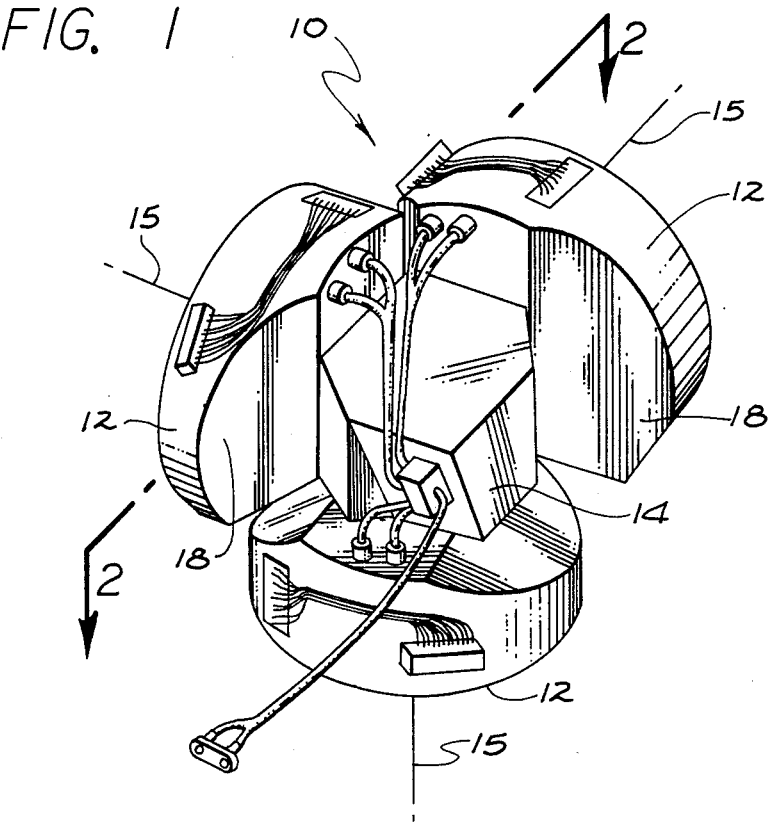
FIG. 1 is a perspective view of three sensing devices (RLG's are illustrated) mounted to a common sensor block in accordance with a preferred embodiment of the invention.
Figure 2:
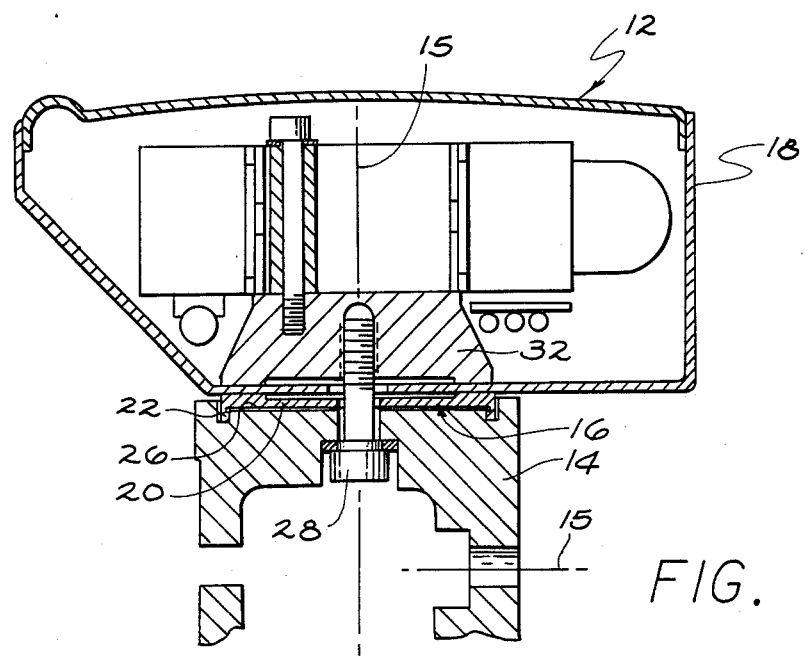
FIG. 2 is a fragmentary cross-sectional view of one of the RLG's and a portion of the block of FIG. 1, taken along the line 2—2.

Referring to the drawings, specifically FIGS. 1 through 3, a sensor assembly 10 constructed in accordance with a preferred embodiment of the invention has three sensor devices 12 (illustrated as RLG's) carried by a common sensor mounting block 14 so that the input axes 15 of the sensors 12 are aligned perpendicular to each other and remain in such alignment through an operating temperature range. This is accomplished by providing a mounting flexure 16 at the interface between the block 14 and a case 18 of each sensor. The flexure 16 is an integral unit made up of a flexure base plate 20 and a flexure skirt 22 extending from the circumference thereof in a direction parallel to the axis 15. The flexure 16 is made of a material having the same coefficient of expansion as the sensor case 18 to prevent movement at the interface with the case. Creeping or slippage between the flexure 16 and the block 14 under thermal stress is avoided by producing a tight surface-to-surface fit of an annular contracting surface 24 of the flexure skirt with an outer cylindrical surface of a boss 26 of the block. The sensor 12 is held to the block 14 by a central bolt 28 which extends through the block along the axis 15 to engage a pedestal 32 within the sensor case. The bolt 28 provides an axial load for holding the sensor to the block.

Although the skirt 22 of the flexure 16 is circularly cylindrical in the embodiments illustrated herein, it will be understood that the skirt and its annular contacting surface need not be circular at all. Instead, they may be shaped as squares, rectangles or other geometric figures symmetric about a point. Thus, the term "annular" as used herein encompasses surfaces having noncircular cross sections. The circular embodiment is preferred, however, for ease of fabrication.

The flexure 16 may, of course, be constructed to contact the block 14 with an outwardly directed surface 30 of the skirt 22 instead of the inwardly directed annular surface 24. It would then engage an inner cylindrical surface of the block and would operate in the same manner as the embodiments described in detail herein. The principal difference is that the forces on the flexure and the block would be reversed.

Referring now to FIGS. 4A and 4B which illustrate the behavior of a generalized mounting flexure 16a under thermal stress, the flexure has a skirt 22a extending from a base plate 20a to a circular lower edge 34 which engages a block 14a. In the illustrated embodiment, the lower edge 34 is confined within a groove 36 of the block, causing the lower end of the skirt 22a to move radially with the block during thermal expansion and construction. Alternatively, the edge 34 might engage the block in any other positive manner, such as by adhesive or welding, as long as the stress requirements of the application are met. In any of these structures, since the block 14a is made of a material having a coefficient of thermal expansion different from that of the flexure 16a, the skirt 22a and the base plate 20a are stressed and deflected by the block as the temperature changes.

When the block 14a has a higher thermal expansion coefficient than the flexure 16a, as is often the case, an increase in temperature produces an outward radial displacement of the block relative to the axis 15a. This forces the lower edge 34 of the skirt 22a outwardly from the broken-line equilibrium condition and causes the base plate 20a to deflect downwardly, as shown in FIG. 4B. Because the shirt 22a is symmetric about the axis 15a, the deflection force at any point on the skirt 22a is equal and opposite to the force at a diametrically opposite location on the skirt. Thus, all forces in a plane perpendicular to the axis 15a cancel out, preventing motion in that direction. A decrease in temperature causes the block 14a to contract at a greater rate than the flexure 16a, resulting in a radially inward deflection of the skirt 22a from the broken-line equilibrium condition (see FIG. 4A). This causes the base plate 20a to bow slightly in an upward direction. However, the symmetry of the flexure prevents net motion perpendicular to the axis.

Due to the symmetry of the stresses on the flexure, alignment relative to the axis does not vary as a function of temperature. The flexure and the sensor mounted to it undergo predictable and repeatable deflections, as described above, but do not experience erratic displacement or "creeping" relative to the axis because there is no slippage at the interface with the block. This holds true for the embodiment illustrated in FIGS. 2 and 3, as well as the embodiment described in connection with FIGS. 4A and 4B, provided that the annular contacting surface 24 of FIG. 3 forcibly engages the boss 26 at all temperatures within the operating range.

In order for the annular contacting surface 24 of FIG. 3 to engage the boss 26 in the desired manner, the boss 26 must have an outer surface 38 which is complementary to the inwardly directed contacting surface 24 of the skirt 22 and is greater in diameter than the contacting surface 24 over the working temperature range. This condition can be expressed as: $D_{Al\ block} > D_{insert}$. In most guidance-and-control applications, the condition must be satisfied for temperatures between −60 and 200 degrees Fahrenheit. This is accomplished by choosing the unstressed diameters of the contacting surface 24 and the complementary surface 38 at ambient temperature so that their difference exceeds the expected differential in expansion or contraction when the assembly is taken from ambient to either of the temperature extremes.

The boss 26 and its critical outer surface 38 are preferably recessed within the block 14 for compactness, as illustrated in FIG. 3. For this reason, the region of the block surrounding the boss 26 defines a groove having an outer cylindrical wall 40 and a lower wall 42 for reception of the skirt 22. When the skirt is in position within the groove, the outer surface of the skirt is spaced from the outer wall 40 to facilitate installation of the flexure and to avoid interference with the block. The skirt 22 abuts the bottom wall 42 to carry the mounting load applied by the bolt 28.

The upper surface of the flexure 16 engages the sensor case 18 at a raised outer region 46. An interior region 48 of the flexure surface is recessed downwardly to avoid contact with the sensor and to permit the base plate to deflect upwardly at low temperatures (FIG. 4A). Similarly, a space 50 is provided between the underside of the base plate 20 and the top of the boss 26 to prevent sliding engagement during thermal expansion and to permit downward deflection of the base plate at high temperature (Figure 4B). Movement of the flexure 16 between the COLD and HOT conditions of FIGS. 4A and 4B is further facilitated by providing an undercut groove 52 above the annular contacting surface 24 and below the base plate 20 of the flexure. This prevents the upper edge 54 of the boss 26 from acting as a fulcrum during deflection and acts to reduce localized stress on the flexure and the block.

Another refinement in the structure of the present invention is the spacing of the walls of the block 14, the flexure 16 and the sensor case 18 from the shank of the bolt in the assembled condition. This prevents binding against the bolt during expansion, contraction and deflection of the parts. The bolt 28 could taken the form of more than one fastener or a clamp of some sort, as long as adequate force is applied without binding against the flexure 16.

In choosing a material and dimensions for the flexure 16, it is useful to consider the forces acting on the flexure. As described, the forces acting on and within the flexure are primarily elastic forces which counter relative displacement and absorb radial stress due to expansion and contraction of the block.

These forces are best analyzed with respect to the following variables of the system:

D - flexure skirt diameter
E - modulus of elasticity
$F_d$ - force of deflection/inch
l - flexure skirt length
T - temperature
t - flexure skirt thickness
$Y_A$ - flexure skirt deflection at A
$\psi$ - flexure skirt slope
$\nu$ - Poisson's Ratio
$\mu$ - coefficient of friction
$\alpha_{block}$ - coefficient of expansion of block
$\alpha_{flexure}$ - coefficient of expansion of flexure
$\zeta$ - tensile stress
$\zeta_y$ - tensile strength of yield In this context, radial displacement of the skirt 22 at A (FIG. 5) is given by the relation:

$$Y_A = D(\alpha_{block} - \alpha_{flexure})(T_2 - T_1) \quad \text{Equation 1}$$

It can be shown that elastic forces acting on the skirt art defined by the relation:

$$Y_A = \frac{F_d}{2\frac{Et^3}{12(1-\nu^2)}\lambda_1^3} \cdot \frac{(\cosh\lambda k \sinh\lambda 1 - \cos\lambda 1 \sin\lambda 1)}{(\sinh^2\lambda 1 - \sin^2\lambda 1)} \quad \text{Equation 2}$$

and that the slope at A is given by:

$$\psi_A = \frac{F_d}{2\frac{Et^3}{12(1-\nu^2)}\lambda^2} \cdot \frac{(\sinh^2\lambda 1 + \sin^2\lambda 1)}{(\sinh^2\lambda 1 - \sin^2\lambda 1)} \quad \text{Equation 3}$$

where $$\lambda = \frac{12(1-\nu^2)^{\frac{1}{4}}}{D^2 1^2} \quad \text{Equation 4}$$

The tensile stress at A is then given by $$\zeta_{t-A} = F_d/2t \quad \text{Equation 5}$$

or $$\zeta_{t-A} = Y_A E/D \quad \text{Equation 6}$$

and the radial stress at A is:

$$\zeta_{r-A} = F_d \quad \text{Equation 7}$$

The bending stress at B is:

$$\zeta_{b-B} = 48 F_d l/t^2 \quad \text{Equation 8}$$

Solving equations 1 and 2 for $F_d$ and using the resulting value to calculate the tensile, radial and bending stresses identified above, the materials are chosen to satisfy the following elastic conditions, with a safety factor:

$$\zeta_{t-A} \& \zeta_{r-A} \& \zeta_{b-B} < \zeta_y \text{ (flexure)} \quad \text{Equation 9}$$

and $$\zeta_{t-A} \& \zeta_{r-a} < \zeta_y \text{ (block)} \quad \text{Equation 10}$$

The stresses on the flexure and on the mounting block can be calculated from these relationships, permitting selection of materials to withstand them within the elastic range. In practice, applicant has selected the following characteristics when the sensors are RLG's having Hy-Mn-80 cases and the mounting block is aluminum:

D=2.05"
t=0.75"
l=0.35"
$\alpha_{block}(A1)$=11.0–15.0 PPM/°F.

The material of the flexure itself must closely match Hy-Mu-80 in expansion coefficient, be a good heat conductor and be strong enough to withstand the calculated stresses. Under these circumstances, the flexure may be made of Hy-Mu-80 or stainless steel. Stainless steel is preferred due to its lower cost and higher tensile strength. The stainless steel which best matches Hy-Mu-80 in expansion coefficient is AISI type 416 ($\alpha$=6.5 PPM/°F.), although type 420 ($\alpha$=6.8 PPM/°F.) can also be used.

Figure 6:
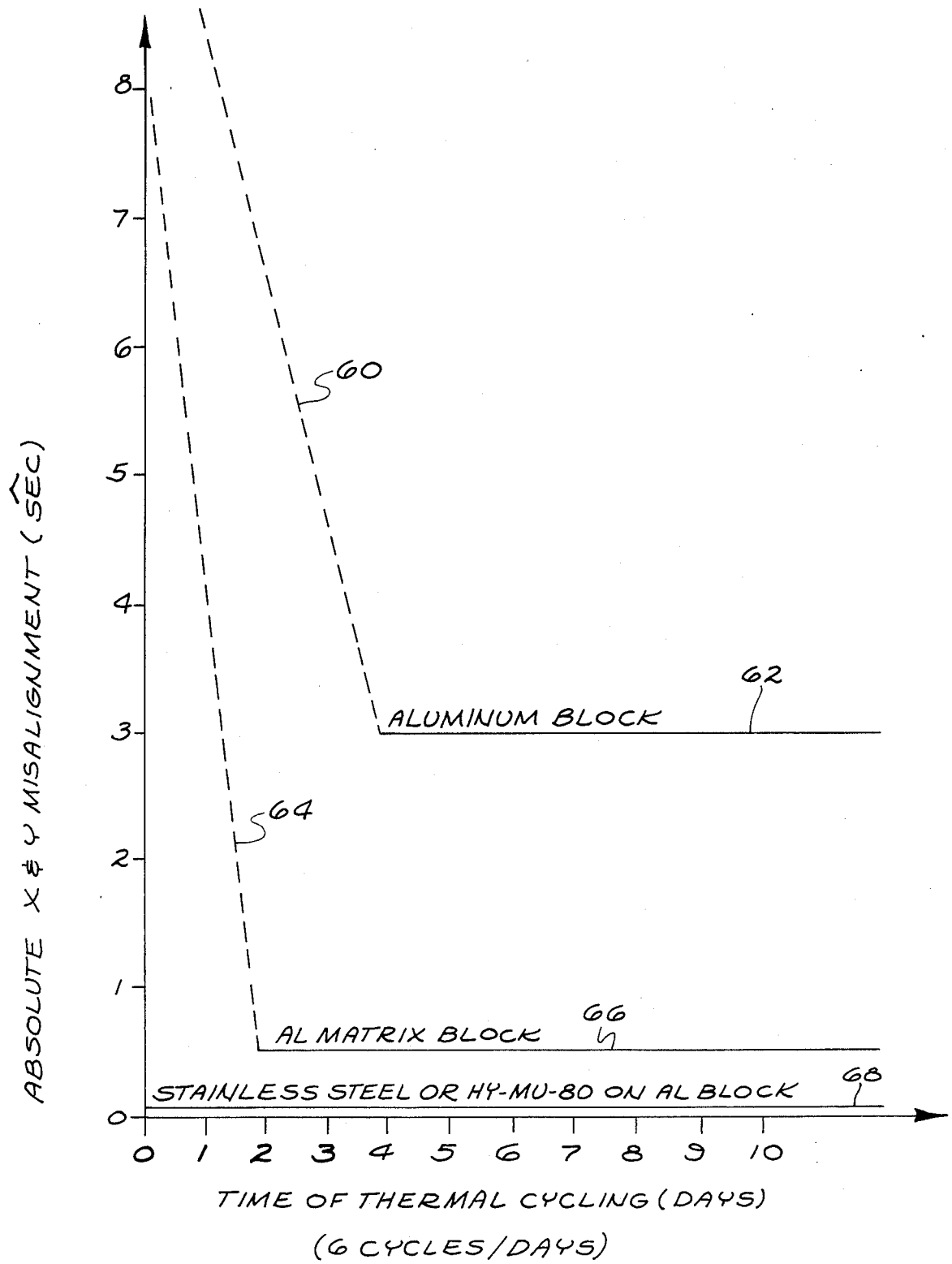
FIG. 6 is a graphical representation of absolute misalignment within a plane perpendicular to the input axis of the RLG of FIGS. 1 and 2, as a function of thermal cycling time for different block and flexure materials.

Referring to FIG. 6, absolute misalignment in the x and y directions perpendicular to the input axis is shown for an exemplary RLG arrangement as a function of days of thermal cycling (6 cycles per day). When an RLG is bolted directly to an aluminum block without the flexure 16, misalignment along the x and y axes goes through a transient phase (indicated by a broken line 60) before reaching a steady state value of approximately 3 arc-seconds (indicated by a solid line 62). This level or error is unacceptable for guidance purposes. To maintain the required precision, misalignment preferably is kept below 1 arc-second and in no case is allowed to exceed 2 arc-seconds. The case in which the sensor block is made of aluminum matrix material is depicted by a broken line 64 (transient condition) and a solid line 66 (steady state condition), wherein transient misalignment is greater than 1 arc-second and steady state misalignment is less than 1 arc-second. However, this structure is unsatisfactory due to the high cost and difficulty of machining aluminum matrix material.

The extremely small misalignment experienced with the flexure of the present invention, whether it is made of stainless steel or Hy-Mu-80, is depicted by a horizontal line 68 of FIG. 6. Misalignment error is essentially the same from the beginning of the test through the twelfth day, due to an absence of slippage in the x-y plane.

As shown by the foregoing description, positive engagement between the flexure 16 and the sensor block 14 may be achieved either at the inwardly directed annular surface 24 of the flexure skirt 22 (FIG. 3), at the outwardly directed surface 30 of the skirt, or at the lower edge 34 of the skirt (FIGS. 4A and 4B). It is preferred to use the inwardly facing annular surface 24 and either shrink-fit or force-fit the flexure over the boss 26. In the case of a shrink-fit, the flexure is heated, the sensor block 14 is cooled, or both, to reach a point at which the annular contacting surface 24 is large enough relative to the outer surface 38 of the boss 26 to slide over it. A preferred method of preparing the parts for engagement is to cool the block to a temperature of −350 degrees Fahrenheit by placing it in a bath of liquid nitrogen while leaving the flexure at ambient temperature. The parts are then allowed to return to ambient temperature, whereupon contraction and/or expansion produces intimate surface-to-surface contact along the annular surface 24. As stated above, the fit must be intimate throughout the working temperature range. Beyond this, however, it should be forceful enough to overcome frictional forces at the bottom wall 42 of the block as expansion and contraction occurs. The latter consideration is relatively easy to achieve.

Referring again to FIG. 4B, deflection of the flexure 16 at high temperatures occurs in such a way as to rotate the raised outer regions 46 of the flexure inwardly to more closely match the slightly convex shape of the gyro case resulting from the downward force of the mounting bolt 28. The inward rotation of the raised region 46 presents a broader area of contact with the case and increases thermal conductivity within the assembly. This helps dissipate temperature gradients which can inhibit gyro performance.

From the above, it is seen that the structure of the present invention provides an interface between an RLG or other sensor device of a mounting block having different thermal expansion characteristics. In doing so, the invention virtually eliminates the problem of slippage or creeping at the interface and thereby improves the accuracy of the sensor.

The appended claims are not limited to the embodiments described herein, but rather are intended to cover all variations and adaptations which fall within the true scope and spirit of the present invention. For example, the flexure of the present invention need not be circular in cross-section, as long as it is symmetric about an axis perpendicular to the block and engages the block along an annular contacting surface. Similarly, the RLG or other sensor need not be mounted with its input axis parallel to the axis of symmetry of the flexure. The input axis can be parallel, perpendicular or oblique to the axis of flexure.

What is claimed is:

1. A flexure for mounting an inertial sensing device having a preselected input axis to a support in a dynamic thermal environment comprising:
   a base having a pair of opposed major surfaces transverse to the input axis, the base being positionable between the sensing device and the support so that a first of the major surfaces faces the inertial sensing device and a second of the major surfaces faces the support; and
   a skirt extending axially from the second major surface of the base to form an annular contacting surface;
   the skirt being constructed and arranged so that the contacting surface engages the support in intimate surface-to-surface contact over a preselected temperature range to restrain the flexure from relative slipping movement when exposed to thermal stresses.

2. The flexure of claim 1 wherein: the base is substantially planar; and the skirt is formed integrally with the base.

3. The flexure of claim 2 for use in mounting a sensing device having a mounting portion with a first coefficient of thermal expansion to a support having a second different coefficient of thermal expansion, wherein:
   the flexure is made of a material having a preselected coefficient of thermal expansion substantially equl to said first coefficient.

4. The flexure of claim 2 wherein:
   the contacting surface of the skirt interfits with a complementary portion of the support to provide intimate surface-to-surface contact.

5. The flexure of claim 4 wherein:
   the annular contacting surface is circularly cylindrical.

6. A sensor assembly capable of operating in a dynamic thermal environment comprising:
   a sensing device for measuring inertial inputs relative to a preselected input axis;
   a support;
   a flexure disposed between the sensing device and the support, the flexure having:
      a base with a first major surface facing the inertial sensing device and a second major surface facing the support, said first and second major surfaces being transverse to the input axis; and
      a skirt extending axially from the second major surface of the base to an annular contacting surface;
   means for anchoring the contacting surface of the skirt to the support to restrain the flexure from relative slipping movement when exposed to thermal stresses; and
   means for fastening the sensing device to the support.

7. The sensor assembly of claim 6 wherein:
   the base is substantially planar; and
   the skirt is formed integrally with the base.

8. The sensor assembly of claim 7 wherein:
   the sensing device includes a mounting portion;
   the mounting portion and the support are made of materials having different coefficients of thermal expansion; and
   the flexure is made of a material having a preselected coefficient of thermal expansion substantially equal to the coefficient of the mounting portion.

9. The sensor assembly of claim 7 wherein:
   the anchoring means comprises a portion of the support having a complementary surface which interfits with the annular contacting surface of the skirt to provide intimate surface-to-surface contact over a preselected temperature range.

10. The sensor assembly of claim 9 wherein:
the annular contacting surface of the skirt and said portion of the support exert radial forces on each other over said temperature range.

11. The sensor assembly of claim 10 wherein:
the annular contacting surface of the skirt is shrink-fitted to the complementary surface of the support.

12. The sensor assembly of claim 10 wherein:
the annular contacting surface of the skirt forms a force fit with the complementary surface of the support.

13. The sensor assembly of claim 7 wherein:
the annular contacting surface is circularly cylindrical; and
the anchoring means comprises a portion of the support having a complementary circularly cylindrical surface which provides intimate surface-to-surface contact with the annular contacting surface.

14. The sensor assembly of claim 7 wherein:
the base has a circumferential edge portion; and
the skirt joins the base at the circumferential edge portion.

15. A flexure for mounting a sensing device to a support in a dynamic thermal environment comprising:
a base having a pair of opposed major surfaces, the base being positionable between the sensing device and the support so that a first of the major surfaces faces the sensing device and a second of the major surfaces faces the support; and
a skirt formed integrally with the base and extending axially from the second major surface of the base to form an annular contacting surface;
the skirt being engageable with the support over said contacting surface to restrain the flexure from relative slipping movement when exposed to thermal stresses;
the annular contacting surface of the skirt being an inner cylindrical surface smaller in diameter than the complementary portion of the support and interfitting with said complementary portion to provide intimate surface-to-surface contact.

16. A second assembly capable of operating in a dynamic thermal environment comprising:
a sensing device;
a support;
a flexure disposed between the sensing device and the support, the flexure having:
a base with a first major surface facing the sensing device and a second major surface facing the support; and
a skirt formed integrally with the base and extending axially from the second major surface of the base to an inwardly directed cylindrical contacting surface;
means for anchoring the contacting surface of the skirt to the support to restrain the flexure from relative slipping movement when exposed to thermal stresses, said anchoring means comprising a portion of the support having a complementary outwardly directed cylindrical surface which provides intimate surface-to-surface contact with the contacting surface of the skirt;
the contacting surface of the skirt being smaller in diameter than the complementary surface of the support over a preselected temperature range; and
means for fastening the sensing device to the support.

17. A sensor assembly capable of operating in a dynamic thermal environment comprising:
a gyroscope having a preselected input axis;
a support;
a flexure disposed between the gyroscope and the support, the flexure including:
a base having a central axis which coincides with the input axis of the gyroscope and having a first major surface facing the gyroscope and a second major surface facing the support; and
a skirt formed integrally with the base and extending axially from the second major surface of the base to an inwardly directed cylindrical contacting surface;
means for anchoring the contacting surface of the skirt to the support to restrain the flexure from relative slipping movement when exposed to thermal stresses; and
means for fastening the gryoscope of the support.

18. The sensor assembly of claim 17 wherein:
the fastening means comprises at least one fastener parallel to said input axis.

19. The sensor assembly of claim 18 wherein:
said at least one fastener extends from the support to the sensing device and does not contact the flexure.

20. A sensor assembly capable of operating in a dynamic thermal environment comprising:
a sensing device;
a support;
a flexure disposed between the sensing device and the support, the flexure having:
a base with a first major surface facing the sensing device and a second major surface facing the support, the first major surface having a raised outer region in contact with the sensing device and a recessed central region spaced from the sensing device; and
a skirt formed integrally with the base and extending axially from the second major surface of the base to an annular contacting surface;
means for anchoring the contacting surface of the skirt to the support to restrain the flexure from relative slipping movement when exposed to thermal stresses; and
means for fastening the sensing device to the support.

* * * * *